United States Patent
Adireddy et al.

(10) Patent No.: US 10,714,753 B1
(45) Date of Patent: *Jul. 14, 2020

(54) METHOD OF MAKING SILICON-CARBIDE REINFORCED SOLID ELECTROLYTE BATTERY MATERIALS

(71) Applicant: Nanostar Inc., New Orleans, LA (US)

(72) Inventors: Shiva Adireddy, New Orleans, LA (US); Alexander L. Girau, New Orleans, LA (US); Jonathan Goodman, Evanston, IL (US); Meysam Shahami, New Orleans, LA (US); Byoungchul You, Metairie, LA (US); Leigang Xue, Metairie, LA (US)

(73) Assignee: Nanostar Inc., New Orleans, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/790,964

(22) Filed: Feb. 14, 2020

Related U.S. Application Data

(60) Division of application No. 16/668,161, filed on Oct. 30, 2019, now Pat. No. 10,608,256, which is a (Continued)

(51) Int. Cl.
| | |
|---|---|
| *H01M 4/00* | (2006.01) |
| *H01B 1/00* | (2006.01) |
| *H01M 4/62* | (2006.01) |
| *H01M 10/0562* | (2010.01) |
| *H01M 10/0525* | (2010.01) |
| *H01M 4/133* | (2010.01) |
| *H01M 4/38* | (2006.01) |

(Continued)

(52) U.S. Cl.
CPC ............... *H01M 4/62* (2013.01); *H01B 1/04* (2013.01); *H01M 4/133* (2013.01); *H01M 4/134* (2013.01); *H01M 4/364* (2013.01); *H01M 4/386* (2013.01); *H01M 4/587* (2013.01); *H01M 10/0525* (2013.01); *H01M 10/0562* (2013.01); *H01M 10/0565* (2013.01); *H01M 2004/027* (2013.01); *H01M 2300/0068* (2013.01); *H01M 2300/0071* (2013.01); *H01M 2300/0082* (2013.01); *H01M 2300/0091* (2013.01)

(58) Field of Classification Search
CPC ... H01B 1/00; H01B 1/04; H01B 1/18; H01B 1/24; H01M 4/04; H01M 4/36; H01M 4/38; H01M 4/386
See application file for complete search history.

(56) References Cited

U.S. PATENT DOCUMENTS

| | | |
|---|---|---|
| 4,154,787 A | 5/1979 | Brown |
| 4,515,860 A | 5/1985 | Holzl |

(Continued)

OTHER PUBLICATIONS

Wen et al "High capacity silicon/carbon composite anode materials for lithium ion batteries", Electrochemistry Communications 5 (2003) 165-168.*

(Continued)

*Primary Examiner* — Mark Kopec

(57) ABSTRACT

Solid state compositions for use in an anode of a secondary battery, anodes, and lithium ion batteries are provided which include silicon carbide nanofibers, preferably carried in and reinforcing both an anode active material and a solid electrolyte. Methods of production and use are further described.

6 Claims, 2 Drawing Sheets

Related U.S. Application Data continuation-in-part of application No. 16/415,252, filed on May 17, 2019, now Pat. No. 10,461,325.

(60) Provisional application No. 62/846,807, filed on May 13, 2019.

(51) Int. Cl.

| | |
|---|---|
| *H01M 10/0565* | (2010.01) |
| *H01M 4/36* | (2006.01) |
| *H01M 4/134* | (2010.01) |
| *H01M 4/587* | (2010.01) |
| *H01B 1/04* | (2006.01) |
| *H01M 4/02* | (2006.01) |

(56) References Cited

U.S. PATENT DOCUMENTS

| | | | |
|---|---|---|---|
| 5,326,732 A | 7/1994 | Ogawa | |
| 7,776,473 B2 | 8/2010 | Aramata et al. | |
| 7,906,238 B2 | 3/2011 | Le et al. | |
| 8,071,238 B2 | 12/2011 | Le et al. | |
| 9,178,208 B2 | 11/2015 | Park et al. | |
| 9,190,186 B2 | 11/2015 | Sugiyama et al. | |
| 9,397,338 B2 | 7/2016 | Park et al. | |
| 9,553,303 B2 | 1/2017 | Park et al. | |
| 9,570,751 B2 | 2/2017 | Cha et al. | |
| 9,583,757 B2 | 2/2017 | Park et al. | |
| 9,608,262 B2 * | 3/2017 | Aramata | H01M 4/0421 |
| 9,806,328 B2 | 10/2017 | Park et al. | |
| 9,941,509 B2 | 4/2018 | Park et al. | |
| 9,997,765 B2 | 6/2018 | Park et al. | |
| 10,103,378 B2 | 10/2018 | Park et al. | |
| 10,211,454 B2 | 2/2019 | Newbound et al. | |
| 10,461,325 B1 * | 10/2019 | Xue | H01M 4/386 |
| 10,608,256 B1 * | 3/2020 | Adireddy | H01M 4/134 |
| 2013/0344391 A1 | 12/2013 | Yushin et al. | |
| 2014/0255785 A1 | 9/2014 | Do et al. | |
| 2014/0264201 A1 | 9/2014 | Bouvy et al. | |
| 2015/0295227 A1 | 10/2015 | Zhao et al. | |
| 2015/0318571 A1 | 11/2015 | Baba et al. | |
| 2015/0325848 A1 | 11/2015 | Yamashita et al. | |
| 2016/0365567 A1 * | 12/2016 | Troegel | H01M 4/364 |
| 2018/0175390 A1 | 6/2018 | Sun et al. | |

OTHER PUBLICATIONS

Wang et al "A novel carbon-silicon composite nanofiber prepared via electrospinning . . .", Journal of Power Sources 195 (2010) 5052-56.*

Lee et al "Spherical silicon/graphite/carbon composites as anode material for lithium-ion batteries", Journal of Power Sources 176 (2008) 353-58.*

Bi, Y. et al. "In-situ catalytic preparation and characterization of SiC nanofiber coated graphite flake with improved Nater-wettability" Ceramics International 43 (2017) 15755-15761.

Cheng, X.-B. et al. Recent Advances in Energy Chemistry between Solid-State Electrolyte and Safe Lithium-Metal Anodes, Chem 2018, 5, 74-96.

Dai, J. et al. "Synthesis and growth mechanism of SiC nanofibers on carbon fabrics" CrystEngComm 2017.

Gao, Z. et al. Promises, Challenges, and Recent Progress of Inorganic Solid-State Electrolytes for All-Solid-State Lithium Batteries, Adv. Mater. 2018, 30, 1705702.

Janek, J. and Zeier, W.G., A solid future for battery development, Nature Energy, 2016, 1, 1.

Jiang, H. et al. "The pyrolysis mechanism of phenol formaldehyde resin" Polymer Degradation and Stability 97 (2012) 1527-1533.

Lewandowski, A. and Swiderska-Mocek, A. Ionic liquids as electrolytes for Li-ion batteries—An overview of electrochemical studies, J. Power. Sources 2009, 194, 601-609.

Long, L. et al., Polymer electrolytes for lithium polymer batteries, J. Mater. Chem. A, 2016, 4, 10038.

Manthiram, A. et. al. Lithium battery chemistries enabled by solid-state electolytes, Nature Reviews Materials, 2017, 2, 16103.

Ritts, A.C.; Li, H.; Yu, Q. "Large Scale Synthesis of SiC Nanofibers from Various Carbon Precursors" NSTI-Nanotech, 2008, 612-615.

Sun, X.; Shao, C.; Zhang, F.; Li, Y.; Wu, Q.; Yang, Y. "SiC Nanofibers as Long-Life Lithium-Ion Battery Anode Materials" Frontiers in Chem. 2018, 6, 166.

Vertruyen, B. et al. "Spray-drying of electrode materials for lithium and sodium-ion batteries" Materials 2018, 11, 1076.

Xu, Q. et al. "Nano/Micro-Structured Si/C Anodes with High Initial Coulombic Efficiency in Li-Ion Batteries" Chem. Asian J. 2016, 11, 1205-1209.

Xu, Q. et al. "Stable Sodium Storage of Red Phosphorus Anode Enabled by a Dual-Protection Strategy" ACS Appl. Mater. Interfaces 2018, 10, 30479-30486.

Yang, Q. et al. Ionic liquids and derived materials for lithium and sodium batteries, Chem. Soc. Rev., 2019, 47, 2020.

Zhang, H.L. et al. "Urchin-like nano/micro hybrid anode materials for lithium ion battery" Carbon 44 (2006) 2778-2784.

Zhang, M. et. al. "Interweaved Si@C/CNTs&CNFs composites as anode materials for Li-ion batteries" J. Alloys and Compounds 2014, 588, 206-211.

Zhou, J.Y. et al. "Terbium-Catalyzed Selective Area Growth of SiC Nanorods: Synthesis, Optimal Growth, and Field Emission Properties" J. Am. Ceram. Soc., 93 [2] 488-493 (2010).

Zhou, W.; Long, L.; Xiao, P.; Li, Y.; Luo, H.; Hu, W.; Yin, R. "Silicon carbide nano-fibers in-situ grown on carbon fibers for enhanced microwave absorption properties" Ceramics Intern. 2017, 43, 5628-5634.

* cited by examiner

METHOD OF MAKING SILICON-CARBIDE REINFORCED SOLID ELECTROLYTE BATTERY MATERIALS

CROSS-REFERENCE TO RELATED APPLICATIONS

This application is a DIV of Ser. No. 16/668,161 (filed Oct. 30, 2019, now U.S. Pat. No. 10,608,256), which application is a CIP of Ser. No. 16/415,252 (filed May 17, 2019, now U.S. Pat. No. 10,461,325), which application claims benefit of Ser. No. 62/846,807 (filed May 13, 2019).

FIELD OF THE INVENTION

This invention is related to the products and preparations of silicon nanocrystal materials for use in lithium-ion batteries.

BACKGROUND

Lithium-ion (Li+) secondary or rechargeable batteries are now the most widely used secondary battery systems for portable electronic devices. Conventionally, lithium-ion secondary batteries contain a liquid electrolyte, such as an organic carbonate carrying a lithium salt. Unfortunately, some organic carbonates decompose to form passivation layers called solid electrolytic interphase (SEI) layers on electrode or electrode material surfaces, decreasing the concentration of available electrolyte and thereafter decreasing the efficiency of the cell. Even more concerning, the organic materials used to form liquid electrolytes are inflammable leading to restrictions on the shipping, storage, and use of lithium-ion batteries.

Overcoming these detractions, lithium-ion batteries with solid phase electrolytes have been prepared. For example, U.S. Pat. No. 6,277,524 discloses a solid electrolyte for lithium batteries based on the general formula Li$_z$S—GeS$_2$—X wherein "X" is at least one member selected from the group consisting of Ga$_2$S$_3$ and ZnS, or Li$_2$S—SiS$_2$—P$_2$S$_5$. U.S. Pat. No. 8,075,865 discloses a class of lithium argyrodite materials for both primary and secondary storage. Continuing down this vein, U.S. Pat. No. 9,899,702 discloses a sub-class of lithium argyrodite thiophosphates for use in lithium ion batteries.

While these solid phase electrolytes show promise for use in lithium ion batteries, engineering cells with these solid materials requires further improvements. One continuing challenge is interphase boundaries between anodic and cathodic materials and the solid phase electrolyte.

SUMMARY

A first embodiment is a composition for use in an anode of a secondary battery, the composition including an anode active material carried in a solid electrolytic matrix; the solid electrolytic matrix comprising a plurality of SiC nanofibers and a solid electrolyte.

A second embodiment is a method that includes admixing an anode active particulate that includes a reduced carbon matrix carrying a plurality of silicon nanocrystals and a plurality of SiC nanofibers, with a solid electrolyte.

BRIEF DESCRIPTION OF THE FIGURES

For a more complete understanding of the disclosure, reference should be made to the following detailed description and accompanying drawing figures wherein.

Figure 1:
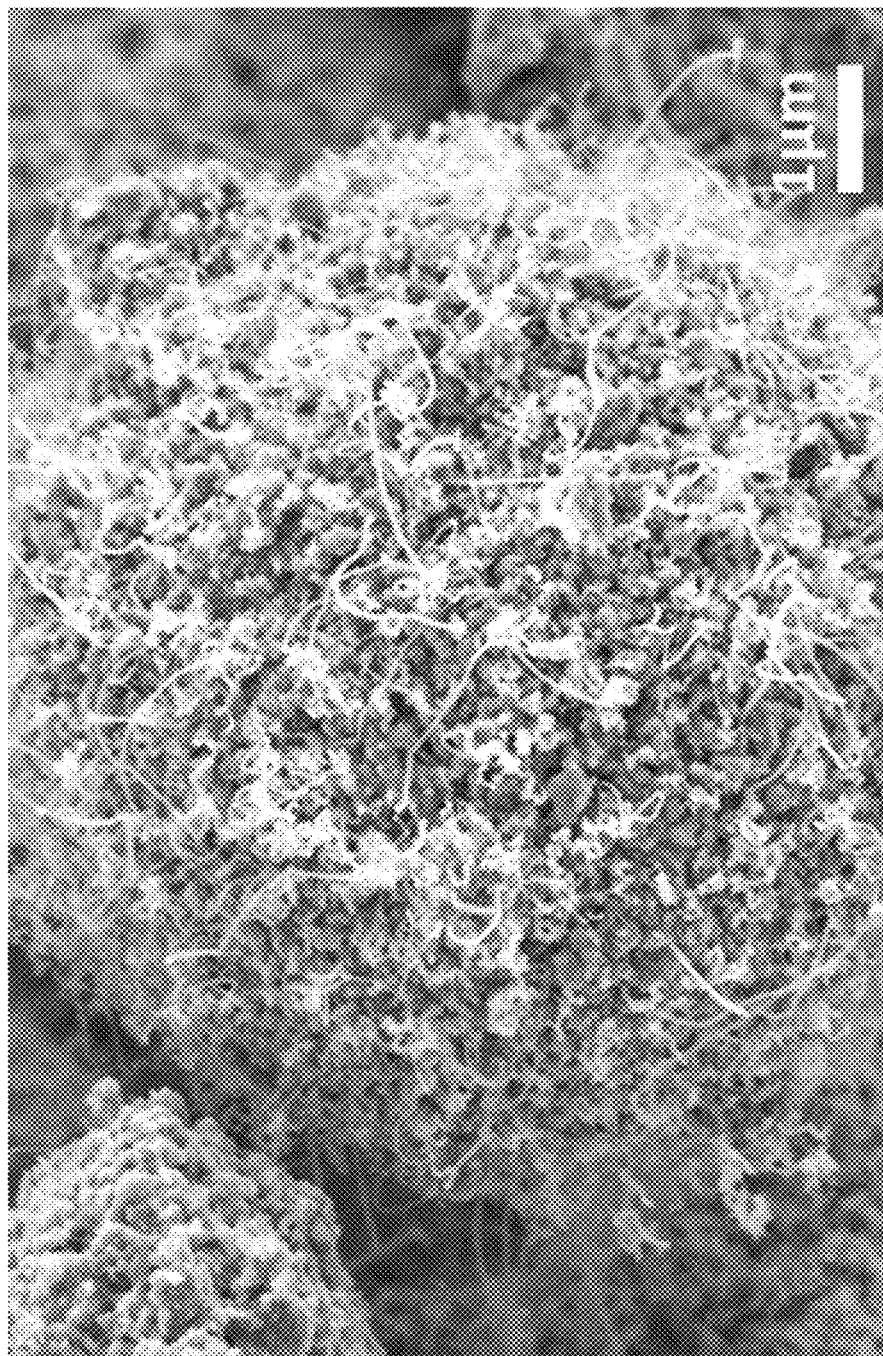
FIG. 1 is an SEM image of an anode active material described herein showing SiC nanofibers.

While specific embodiments are illustrated in the figures, with the understanding that the disclosure is intended to be illustrative, these embodiments are not intended to limit the invention described and illustrated herein.

DETAILED DESCRIPTION

Objects, features, and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

Herein, the use of the word "a" or "an" when used in conjunction with the term "comprising" in the claims and/or the specification may mean "one," but it is also consistent with the meaning of "one or more," "at least one," and "one or more than one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

Herein are described products, processes, anodes, and batteries that feature anode active materials carried in solid electrolyte matrices. One preferred embodiment is a composition for use in an anode of a secondary battery, this composition can include an anode active material carried in a solid electrolytic matrix, preferably where the solid electrolytic matrix is an admixture of a plurality of silicon carbide (SiC) nanofibers and a solid electrolyte. More preferably, the anode active material includes SiC nanofibers extending from a surface thereof, where the SiC nanofibers are imbedded and/or admixed in the solid electrolyte thereby forming the solid electrolytic matrix.

Herein, the solid electrolytic matrix includes SiC nanofibers and a solid electrolyte. Preferably, wherein the SiC nanofibers reinforce a continuous phase that includes, consists essentially of, or consists of solid electrolyte. In one instance, the SiC nanofibers are carried in the continuous phase, that is carried in the solid electrolyte. In another instance, the SiC nanofibers are chemically bound, e.g., ionically, electrostatically, or covalently, to the solid electrolyte (continuous phase).

In another instance, the solid electrolytic matrix includes a solvent. Preferably, the solid electrolytic matrix includes a mass ratio of solvent to solid electrolyte in a range of 1:1 to 1:250, 1:2 to 1:100, 1:5 to 1:50, 1:5 to 1:25, or 1:5 to 1:10.

Preferably, the solid electrolyte is a lithium thiophosphate, for example those lithium thiophosphates described in U.S. Pat. Nos. 8,075,865 and 9,899,702 and incorporated herein by reference. In a preferable instance, the lithium thiophosphate is an argyrodite (i.e. an lithium argyrodite). In one instance, the lithium argyrodite of the general formula (I): Li$^+_{(12-n-x)}$B$^{n+}$X$^{2-}_{6-x}$Y$^-_x$ (I), where B$^{n+}$ is selected from the group consisting of P, As, Ge, Ga, Sb, Si, Sn, Al, In, Ti, V, Nb, and Ta; X$^{2-}$ is selected from the group consisting of S, Se, and Te; Y$^-$ is selected from the group consisting of Cl, Br, I, F, CN, OCN, SCN, and N$_3$; 0≤x≤2. In another instance, the lithium argyrodite can have a formula $Li_6PS_5Z$ where Z=Cl, Br or I. In still another instance, the lithium argyrodite can have a formula $Li_6B^{5+}S_{5-a}X^{2-}{}_aY^-$ where $B^{5+}$ is selected from the group consisting of P, As and Sb, $X^{2-}$ is selected from the group consisting of Se and Te, and $Y^-$ is selected from the group consisting of Cl, Br, I, F, CN, OCN, SCN, $N_3$, and in which. In still yet another instance, the lithium argyrodite can have a formula of $Li_7B^{5+}S_{6-a}X^{2-}{}_a$ (IV) in which $B^{5+}$ is selected from the group consisting of P, As, and Sb, and $X^{2-}$ is selected from the group consisting of Se and Te, and in which $0 \le a \le 2$. Particularly lithium argyrodites include $Li_6PS_5I$, $Li_6PS_5Br$, $Li_6PS_5Cl$, and $Li_7PS_5Se$. In another instance, the lithium phosphate can have a formula of $Li_{7+x}P_{1-y}Si_yS_6$ wherein x is in a range of −0.6 to 0.6 and y is in a range of 0.1 to 0.6. In still yet another instance, the lithium thiophosphate can have a formula of $Li_{7-x+y}PS_{6-x}Cl_{x+y}$, wherein $0.05 \le y \le 0.9$ and $-3.0x+1.8 \le y \le 3.0x+5.7$, preferably the lithium thiophosphate has a formula of $Li_{7-x}PS_{6-x}Cl_x$, in which $0 \le x \le 3$.

In another instance, the solid electrolyte can be a lithium phosphate; lithium lanthanum zirconium oxide; NASICON-type phosphate; LISICON-type germanium oxide; lithium lanthanum titanium oxide; or lithium phosphorous oxynitride. In still another instance, the solid electrolyte can be a mixture of a lithium thiophosphate, lithium phosphate; lithium lanthanum zirconium oxide; NASICON-type phosphate; LISICON-type germanium oxide; lithium lanthanum titanium oxide; and/or lithium phosphorous oxynitride.

In still another instance, the solid electrolyte can be a solid polymer electrolyte, for examples those polymer electrolytes disclosed in Long et al., J. Mater. Chem A, 2016, 4, 10038 and incorporated herein by reference; including but not limited to polyethylene oxide, polypropylene oxide, [bis (methoxy-ethoxy-ethoxy)phosphazene (MEEP), polysiloxane, and copolymers, block copolymers, graft copolymers, blends, or crosslinked-polymers thereof. Further examples, include polymer lithium salts. Preferred polymer include a polyethylene oxide, a copolymer, or a blend thereof.

The SiC nanofibers included in the solid electrolytic matrix can be affixed to the anode active material or can be free standing in the solid electrolyte. In one instance, the SiC nanofibers have length, width, and heights that are between about 5 nm and about 10,000 nm, preferably between about 5 nm and about 5,000 nm, or between about 5 nm and about 1,000 nm. More preferably, the SiC nanofibers are fibrous; that is, the length of the nanofibers are longer than the width and height. In one instance, the SiC nanofibers have a length to width ratio of at least 5, at least 10, at least 15, at least 20, at least 25, at least 30, at least 35, at least 40, at least 45, at least 50, at least 75, at least 100, at least 125, at least 150, at least 175, or at least 200.

The solid electrolytic matrix can further include a solvent, preferably a solvent that is known as a liquid electrolyte. Examples include but are not limited to ethylene carbonate, methylethylene carbonate, fluoroethylene carbonate, and mixtures thereof with or without lithium salts. In some embodiments, the solvent is an organic electrolyte solution that may be prepared by dissolving a lithium salt in an organic solvent. The organic solvent may be any solvent available as an organic solvent in the art. Examples of the organic solvent are propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof. The lithium salt may be any material available as a lithium salt in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, or a combination thereof.

In another instance, the solvent can be an ionic liquid. In one example, the ionic liquid is an imide-based ionic liquid. Examples include imidazolium-based ionic liquids and pyrrolidinium based ionic liquids. Other examples include 1-ethyl-3-methylimidazolium (EMI+), 1-butyl-1-methyl-pyrrolidinium (BMP+), and amyltriethylammonium (ATEA+), for example paired with TFSI⁻, FSI⁻, and/or $PF_6^-$. Preferably, the solvent is an ionic electrolyte which is an ionic liquid that includes a therein dissolved lithium salt. Some examples of ionic liquids, include but are not limited to EMIMTFSI, BMIMTFSI, PMIMTFSI, HMIMTFSI, OMIMTFSI, BMIMTf, $BMIMBF_4$, $BMIMPF_6$, where E=ethyl, B=butyl, P=propyl, H=hexyl, O=octyl, IM=imidazolium, TFSI=bistrifluoromethylsulfonylimide, Tf=trifluoromethanesulfanate. Lithium salts may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, or a combination thereof. Further examples of ionic liquids (and ionic electrolyte) are disclosed in Lewandowski et al. J. Power Sys. 2009, 194, 601-609, and Yang et al. Chem. Soc. Rev. 2018, 47, 2020-2064, each incorporated herein by reference.

Herein, the anode active materials are particulates that include a carbon matrix carrying a plurality of silicon nanocrystals and a plurality of SiC nanofibers. The particulates, preferably, can have a diameter in the range of about 50 nm to about 100 μm, about 100 nm to about 50 μm, about 100 nm to about 25 μm, about 150 nm to about 25 μm, about 200 nm to about 25 μm, about 250 nm to about 25 μm, about 300 nm to about 25 μm, about 350 nm to about 25 μm, about 400 nm to about 25 μm, about 450 nm to about 25 μm, about 500 nm to about 25 μm, and a composition that includes a reduced carbon matrix carrying a plurality of silicon nanocrystals and a plurality of SiC nanofibers. That is, each particulate is, preferably, a composite mixture of the silicon nanocrystals and SiC nanofibers in a reduced carbon matrix. Preferably, the silicon nanocrystal and the SiC nanofibers are interspersed in the reduced carbon matrix.

Each particulate has a surface and an interior volume. Preferably, the interior volume includes the silicon nanoparticles and SiC nanofibers carried within and interspersed in the reduced carbon matrix. In one instance, the SiC nanofibers are entirely within the interior volume. That is, the SiC nanofibers do not extend outwardly from the surface of the particulate. Notably, the surface of the particulate can include the SiC nanofibers. In another instance, the SiC nanofibers are within the interior volume and extend outwardly from the surface of the particulate. In one example, the SiC nanofibers are embedded in the particulate and extend outwardly from the particulate. Preferably, the material is free of non-embedded SiC nanofibers, that is, the material is preferably free of loose or free SiC nanofibers.

Herein, SiC nanofibers refer to SiC materials having length, width, and heights that are between about 5 nm and about 10,000 nm, preferably between about 5 nm and about 5,000 nm, or between about 5 nm and about 1,000 nm. More preferably, the SiC nanofibers are fibrous; that is, the length of the nanofibers are longer than the width and height. In one instance, the SiC nanofibers have a length to width ratio of at least 5, at least 10, at least 15, at least 20, at least 25, at least 30, at least 35, at least 40, at least 45, at least 50, at least 75, at least 100, at least 125, at least 150, at least 175, or at least 200.

In some examples, the SiC nanofibers extend outwardly from the particulate and are at least partially embedded in the particulate. The external SiC nanofiber segments, those that extend from the particulate, can have lengths from about 1 nm to about 1,000 nm, about 1 nm to about 500 nm, about 1 nm to about 400 nm, about 1 nm to about 300 nm, about 1 nm to about 250 nm, about 1 nm to about 200 nm, about 1 nm to about 150 nm, or about 1 nm to about 100 nm.

The SiC nanofibers, preferably, have crystalline SiC domains extending along the length of the nanofiber. In one instance, the SiC nanofibers carry an amorphous surface layer. In one instance, the surface layer is amorphous $SiO_x$ (e.g., wherein x is a value from 1 to 2). In another instance, the surface layer is amorphous carbon. In still another instance, the amorphous layer includes two layers wherein one layer can be $SiO_x$ and the other carbon. In yet another instance, the amorphous layer can include a silicon oxycarbide (SiOxCy) layer.

The particulate has a composition that includes silicon metal, silicon carbide, and carbon (e.g., as represented in the carbon matrix). As used herein and as represented in the carbon matrix, carbon is reduced carbon, i.e., elemental carbon, and can be amorphous carbon, graphite, graphene, porous carbon, diamond, or other polymorphs. Regarding silicon metal, the particulate can include about 1 wt. % to about 75 wt. % silicon metal, about 1 wt. % to about 50 wt. % silicon metal, preferably about 5 wt. % to about 40 wt. % silicon metal, about 10 wt. % to about 35 wt. % silicon metal, or about 15 wt. % to about 30 wt. % silicon metal. Regarding silicon carbide, the particulate can include about 1 wt. % to about 25 wt. % silicon-carbide, preferably about 1.5 wt. % to about 20 wt. % silicon-carbide, about 2 wt. % to about 15 wt. % silicon-carbide, or about 2.5 wt. % to about 10 wt. % silicon-carbide. Regarding carbon, the particulate can include about 10 wt. % to about 90 wt. % carbon, about 20 wt. % to about 90 wt. % carbon, about 25 wt. % to about 90 wt. % carbon, preferably about 20 wt. % to about 80 wt. % carbon, about 30 wt. % to about 70 wt. % carbon, about 40 wt. % to about 65 wt. % carbon, or about 40 wt. % to about 60 wt. % carbon. In one example, the particulate can include about 10 wt. % to about 90 wt. % carbon, about 20 wt. % to about 90 wt. % carbon, about 25 wt. % to about 90 wt. % carbon, preferably about 20 wt. % to about 80 wt. % carbon, about 30 wt. % to about 70 wt. % carbon, about 40 wt. % to about 65 wt. % carbon, or about 40 wt. % to about 60 wt. % carbon and further include about 1 wt. % to about 50 wt. % silicon metal, preferably about 5 wt. % to about 40 wt. % silicon metal, about 10 wt. % to about 35 wt. % silicon metal, or about 15 wt. % to about 30 wt. % silicon metal. This example can still further include about 1 wt. % to about 25 wt. % silicon-carbide, preferably about 1.5 wt. % to about 20 wt. % silicon-carbide, about 2 wt. % to about 15 wt. % silicon-carbide, or about 2.5 wt. % to about 10 wt. % silicon-carbide. In another example, the particulate can include about 10 wt. % to about 90 wt. % carbon, about 20 wt. % to about 90 wt. % carbon, about 25 wt. % to about 90 wt. % carbon, preferably about 20 wt. % to about 80 wt. % carbon, about 30 wt. % to about 70 wt. % carbon, about 40 wt. % to about 65 wt. % carbon, or about 40 wt. % to about 60 wt. % carbon and further include about 1 wt. % to about 25 wt. % silicon-carbide, preferably about 1.5 wt. % to about 20 wt. % silicon-carbide, about 2 wt. % to about 15 wt. % silicon-carbide, or about 2.5 wt. % to about 10 wt. % silicon-carbide. In still yet another example, the particulate can include about 1 wt. % to about 50 wt. % silicon metal, preferably about 5 wt. % to about 40 wt. % silicon metal, about 10 wt. % to about 35 wt. % silicon metal, or about 15 wt. % to about 30 wt. % silicon metal and further include about 1 wt. % to about 25 wt. % silicon-carbide, preferably about 1.5 wt. % to about 20 wt. % silicon-carbide, about 2 wt. % to about 15 wt. % silicon-carbide, or about 2.5 wt. % to about 10 wt. % silicon-carbide.

In one preferable instance, the particulate can include silicon metal (i.e., silicon nanocrystals), silicon carbide, and reduced carbon (e.g., as represented in the reduced carbon matrix). In another instance, the particulate can consist essentially of silicon metal (i.e., silicon nanocrystals), silicon carbide, and reduced carbon (e.g., as represented in the reduced carbon matrix). As used herein, the particulate preferably includes less than 5 wt. %, less than 4 wt. %, less than 3 wt. %, less than 2 wt. %, or less than 1 wt. % of materials other than silicon metal, silicon carbide, and carbon. In still another instance, the particulate can include silicon metal, silicon carbide, carbon, and a catalyst or the remnants of a catalyst. Preferably, the catalyst or remnants of the catalyst do not compose more than 10 wt. %, more than 7.5 wt. %, or 5 wt. % of the particulate.

In another preferred embodiment, the anode active materials include a plurality of particulates, preferably, having a diameter in the range of about 50 nm to about 50 μm, and comprising a silicon-carbide reinforced reduced carbon matrix carrying a plurality of silicon nanocrystals. In one example, the particulates consist essentially of the silicon-carbide reinforced reduced carbon matrix carrying the plurality of silicon nanocrystals. In another example, the particulates are spherical. In still another example, the silicon nanocrystals include greater than about 70 wt. % silicon metal; preferably greater than about 95 wt. % silicon metal. In yet another example, the silicon nanocrystals include a silicon alloy.

The silicon-carbide reinforced reduced carbon matrix preferably includes a carbon-constituent material and SiC nanofibers. As used herein a carbon-constituent material is a reduced carbon-based material that binds/holds the SiC nanofibers and, preferably, is composed of at least 50 wt. %, 60 wt. %, 70 wt. %, 80 wt. %, 90 wt. %, 95 wt. %, or 99 wt. % carbon. In one instance, the carbon-constituent material consists essentially of carbon. In another instance, the carbon-constituent material is the thermolysis product of a carbon matrix precursor, as described below.

In one example, the silicon-carbide reinforced reduced carbon matrix includes SiC nanofibers carried within the carbon-constituent material and includes SiC nanofibers extending from a surface of the reduced carbon-constituent material. In another example, the silicon-carbide reinforced reduced carbon matrix includes interior SiC nanofibers and exterior SiC nanofibers. The interior SiC nanofibers are carried within the carbon-constituent material; the exterior SiC nanofibers extend from a surface of the carbon-constituent material. Exterior SiC nanofibers can be easily observed in FIGS. 1 and 2. A smaller percentage of SiC nanofibers can be observed in other materials.

The materials can be prepared by a process that, preferably, includes thermalizing an admixture of a plurality of silicon nanocrystals, a carbon matrix precursor, and a catalyst or catalyst precursor. The admixture can include a mass ratio of the silicon nanocrystals to the carbon matrix precursor of about 10:1 to about 1:10, about 10:1 to about 1:5, about 5:1 to about 1:5, about 4:1 to about 1:4, about 3:1 to about 1:3, or about 2.5:1 to about 1:2.5, alternatively the admixture can include a mass ratio of the silicon nanocrystals to the carbon matrix precursor of about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10. Alternatively, the admixture can include about 10 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, or 95 wt. % of the silicon nanocrystals; can include about 10 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, or 95 wt. % of the carbon matrix precursor; and can include about 0.01 wt. %, 0.02 wt. %, 0.025 wt. %, 0.03 wt. %, 0.035 wt. %, 0.040 wt. %, 0.045 wt. %, 0.050 wt. %, 0.055 wt. %, 0.060 wt. %, 0.065 wt. %, 0.070 wt. %, 0.075 wt. %, 0.080 wt. %, 0.085 wt. %, 0.090 wt. %, 0.095 wt. %, 0.1 wt. %, 0.2 wt. %, 0.25 wt. %, 0.3 wt. %, 0.35 wt. %, 0.40 wt. %, 0.45 wt. %, 0.50 wt. %, 0.55 wt. %, 0.6 wt. %, 0.65 wt. %, 0.7 wt. %, 0.75 wt. %, 0.8 wt. %, 0.85 wt. %, 0.9 wt. %, 0.95 wt. %, 1 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, 10 wt. % of the catalyst or catalyst precursor.

Herein, silicon nanocrystals preferably have mean diameter of less than about 1,000 nm, 500 nm, 400 nm, 350 nm, 300 nm, 250 nm, 200 nm, 150 nm, 100 nm, 75 nm, or 50 nm, and greater than about 1 nm, 5 nm, 10 nm, 15 nm, 20 nm, 25 nm, 30 nm, 35 nm, 40 nm, 45 nm, or 50 nm. Preferably, the silicon nanocrystals have a $D_{90}$ of about 1,000 nm, 500 nm, 400 nm, 350 nm, 300 nm, 250 nm, 200 nm, 150 nm, 100 nm, 75 nm, or 50 nm; more preferably a $D_{50}$ of about 1,000 nm, 500 nm, 400 nm, 350 nm, 300 nm, 250 nm, 200 nm, 150 nm, 100 nm, 75 nm, or 50 nm. In one instance, the silicon nanocrystals are spherical. In another instance, the silicon nanocrystals have a plate-like morphology. The silicon nanocrystals are preferably composed of silicon metal or a silicon alloy. In one example, the silicon metal is analytically pure silicon, for example, single crystal silicon used in the semiconductor/computer industry. In another example, the silicon metal is recycle or scrap from the semiconductor or solar industries. In still another example, the silicon metal is a silicon alloy. A silicon alloy can be a binary alloy (silicon plus one alloying element), can be a tertiary alloy, or can include a plurality of alloying elements. The silicon alloy is understood to be a majority silicon. A majority silicon particle means that the metal has a weight percentage that is greater than about 50% (50 wt. %) silicon, preferably greater than about 60 wt. %, 70 wt. %, 80 wt. %, 90 wt. %, 95 wt. %, 96 wt. %, 97 wt. %, 98 wt. %, 99 wt. %, or 99.5 wt. % silicon; these can include silicon alloys that comprise silicon and at least one alloying element. The alloying element can be, for example, an alkali metal, an alkaline-earth metal, a Group 13 to 16 element, a transition element, a rare earth element, or a combination thereof, but not Si. The alloying element can be, e.g., Li, Na, Mg, Ca, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, B, Al, Ga, In, Ge, Sn, P, As, Sb, Bi, S, Se, Te, or a combination thereof. In one instance, the alloying element can be lithium, magnesium, aluminum, titanium, vanadium, chromium, manganese, iron, cobalt, nickel, copper, or a mixture thereof. In another instance, the silicon alloy can be selected from SiTiNi, SiAlMn, SiAlFe, SiFeCu, SiCuMn, SiMgAl, SiMgCu, or a combination thereof.

In another example, the silicon nanocrystals are polycrystalline silicon nanocrystals. As used herein, a polycrystalline silicon nanocrystal is a discrete silicon nanocrystal that has more than one crystal domain. The domains can be of the same crystal structure and display discontinuous domains, or the domains can be of different crystal structures. In one example, the domains are all diamond-cubic silicon (e.g., having a lattice constant of 5.431 Å). In another example, the domains include a diamond-cubic silicon and a diamond-hexagonal silicon. In still another example, the domains include a diamond-cubic silicon and amorphous silicon. In yet still another example, the domains include a diamond-cubic silicon, a diamond-hexagonal silicon, and amorphous silicon. In one preferred instance, the silicon metal has a substantial portion that exists in a diamond-cubic crystal structure. Preferably, at least 10 atom %, 20 atom %, 25 atom %, 30 atom %, 35 atom %, 40 atom %, 45 atom %, 50 atom %, 55 atom %, 60 atom %, 65 atom %, 70 atom %, 75 atom %, 80 atom %, 85 atom %, 90 atom %, or 95 atom % of the silicon metal has a diamond-cubic crystal structure. Notably, the silicon metal can be single crystalline or can be polycrystalline. Additionally, the silicon metal can include alloying elements as long as the crystal structure maintains a substantial portion of diamond-cubic structure.

In still another example, the silicon nanocrystals are coated silicon nanocrystals wherein the silicon carries an organic or carbon-based coating. In one instance, the organic coating includes an alkyl or alkynyl functionality bound to a surface of the silicon nanocrystal through a Si—C covalent bond. In another instance, the carbon-based coating includes a graphitic layer (e.g., including 1, 2, 3, 4, 5, 6, 7, 8, 9, or 10 graphene sheets) carried on a surface of the silicon nanocrystal. Preferably, in instances wherein the silicon nanocrystal carries an organic or carbon-based coating, the coated silicon nanocrystal includes more than about 50 wt. %, 55 wt. %, 60 wt. %, 65 wt. %, 70 wt. %, 75 wt. %, 80 wt. %, 85 wt. %, 90 wt. %, or 95 wt. % silicon (e.g., silicon metal or silicon alloy) and more than 0.1 wt. % and less than 50 wt. %, 45 wt. %, 40 wt. %, 35 wt. %, 30 wt. %, 25 wt. %, 20 wt. %, 15 wt. %, 10 wt. %, or 5 wt. % of the organic or carbon-based coating.

In still yet another example, the silicon nanocrystals carry an oxide layer (e.g., a silicon oxide layer). Preferably, the silicon oxide layer has a thickness of less than 10 nm, 9 nm, 8 nm, 7 nm, 6 nm, 5 nm, 4 nm, 3 nm, 2 nm, or 1 nm. In one instance, the oxide layer is a native oxide, in another instance, the oxide layer is a thermal oxidation product.

Herein, a carbon matrix precursor is an organic compound that can be thermally processed to provide a carbon matrix; that is the carbon matrix precursor is an organic compound that can be thermally reduced to provide reduced carbon. Examples of carbon matrix precursors include phenolic resin, pitch, polyacrylonitrile, poly(furfuryl alcohol), and mixtures thereof. Preferably, the carbon matrix precursor is solid at room temperature and pressure, more preferably, the carbon matrix precursor has a melting and/or softening point that is greater than 100° C., 150° C., 200° C., 250° C., or 300° C.

Other examples include, coal tar pitch from soft pitch to hard pitch; coal-derived heavy oil such as dry-distilled liquefaction oil; petroleum-based heavy oils including directly distilled heavy oils such as atmospheric residue and vacuum residue, crude oil, and decomposition heavy oil such as ethylene tar by-produced during a thermal decomposition process of naphtha and so on; aromatic hydrocarbons such as acenaphthylene, decacyclene, anthracene and phenanthrene; polyphenylenes such as phenazine, biphenyl and terphenyl; polyvinyl chloride; a water-soluble polymers such as polyvinyl alcohol, polyvinyl butyral and polyethylene glycol and insolubilized products thereof; nitrogen-containing polyacrylonitriles; organic polymers such as polypyrrole; organic polymers such as sulfur-containing polythiophene and polystyrene; natural polymers such as saccharides, e.g. glucose, fructose, lactose, maltose and sucrose; thermoplastic resins such as polyphenylene sulfide and polyphenylene oxide; and thermosetting resins such as phenol-formaldehyde resin and imide resin.

The catalyst or catalyst precursor can include nickel, copper, iron, zinc, or a mixture thereof. In one instance, the catalyst or catalyst precursor includes nickel, copper, or a mixture thereof. Preferably, the catalyst or catalyst precursor includes nickel. In one particular instance, the catalyst or catalyst precursor is nickel metal or nickel oxide. In another instance, the catalyst precursor is a nickel salt. In one example, the nickel salt can be selected from, for example, nickel acetate, nickel nitrate, nickel chloride, nickel carbonate, nickel perchlorate, or combinations thereof. In one preferred example, the nickel salt includes a nickel nitrate or a combination therewith. Herewith, the terms catalyst and catalyst precursor refer to identifiable compounds or combinations that under reaction conditions provide catalytic sites for reactions. Notably, many identified materials are actually catalyst precursors and the compounds or materials that provide the catalytic sites are unable to be determined. In one specific example, the admixture includes the catalyst precursor; and wherein the process includes reducing the catalyst precursor to a catalyst. Therein, the process can include reducing the catalyst precursor to a catalyst; and then thermalizing the admixture of the plurality of silicon nanocrystals, the carbon matrix precursor, and the catalyst.

In another preferably instance, the admixture includes a plurality of spherical particulates each including silicon nanocrystals, carbon matrix precursor, and catalyst or catalyst precursor. Therewith, the process can further include a step of forming the plurality of spherical particulates by a biphasic technique. In one example, the biphasic technique can be spray drying, emulsification, and/or precipitation. In a preferred example, the biphasic technique is spray drying. In another instance, the admixture can have any shape or size while including silicon nanocrystals, carbon matrix precursor, and catalyst or catalyst precursor. In one instance, this admixture can be a homogeneous solid mass or dispersion. In one example, this mass can be crumbled or triturated prior to the thermalizing step; in another example, the mass can be triturated after thermalizing.

Herein, thermalizing the admixture means increasing a temperature about the admixture, preferably increasing the temperature of the admixture, to about 600° C. to about 1200° C. for about 0.5 to about 5 hours; preferably to a temperature of about 750° C. to about 1100° C., or about 850° C. to about 1000° C. In one example, the admixture is thermalized under a non-oxidizing atmosphere. In another example, the admixture is thermalized under an inert atmosphere; preferably wherein the inert atmosphere includes argon (Ar). In still another example, the admixture is thermalized under a reducing atmosphere; preferably wherein the reducing atmosphere includes hydrogen ($H_2$) and/or an admixture of carbon monoxide (CO) and carbon dioxide ($CO_2$). The reducing atmosphere can further include an inert carrier gas, e.g., nitrogen or argon, preferably, wherein the inert carrier gas is argon. One particularly preferably atmosphere includes carbon monoxide (CO) and carbon dioxide ($CO_2$).

The admixture can further include a graphitic material. Preferably, the graphitic material can be selected from submiconized graphite, micronized graphite, carbon nanotubes, graphene, graphene oxide, and mixtures thereof. In one instance, the graphitic material is submiconized graphite; in another instance, micronized graphite; in still another instance, carbon nanotubes; in yet another instance, graphene; in still yet another instance, graphene oxide; in yet another instance, the graphitic material can be a mixture thereof. In another preferably instance, the catalyst or catalyst precursor is carried on the graphitic material as a catalyst impregnated graphitic material; Therein the admixture includes the plurality of silicon nanocrystals, the carbon matrix precursor, and the catalyst impregnated graphitic material. The admixture can include about 1 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, 10 wt. %, 20 wt. %, 25 wt. %, 30 wt. %, 35 wt. %, 40 wt. %, 45 wt. %, or 50 wt. % of the graphitic material.

In still another instance, the admixture further includes silicon oxide. Preferably, the admixture includes nanoparticles of silicon oxide. In one example, the silicon oxide is amorphous, in another example the silicon oxide is crystalline, in still another example the silicon oxide is polycrystalline. In one particularly preferably example, the admixture includes silicon nanocrystals and silicon oxide nanoparticles; more preferably wherein the silicon nanocrystals have a D50 greater than a D50 of the silicon oxide nanoparticles. In another example, the admixture can include about 1 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, 10 wt. %, 20 wt. %, 25 wt. %, 30 wt. %, 35 wt. %, 40 wt. %, 45 wt. %, or 50 wt. % of the silicon oxide. In another example, the admixture includes a ratio of silicon to silicon oxide of about 10:1, 9:1, 8:1, 7:1, 6:1, 5:1, 4:1, 3:1, 2:1, 1:1, or 1:2.

Alternatively, the admixture can be substantially free of silicon oxides. That is, the admixture can include less than about 1 wt. % silicon oxides, less than about 0.5 wt. % silicon oxides, less than about 0.25 wt. % silicon oxides, less than about 0.1 wt. % silicon oxides, less than about 0.05 wt. % silicon oxides, or less than about 0.01 wt. % silicon oxides; preferably, wherein the admixture is free of silicon oxides as determined by FTIR. Therein, the admixture can further include an oxy-graphitic material; wherein the oxy-graphitic material includes a graphitic material carrying aldehyde and carboxylate groups on the edges of graphic sheets or tubes.

The admixture can further include additives, carriers, solvents, and the like. In one instance, the admixture further includes conductors (e.g., conductive carbon). The conductor(s) can be conductive additives, for example Super P (e.g., MTI), Super C65 (e.g., IMERY), Super C45 (e.g., IMERY), TIMREX KS6 (e.g., MTI), and KS6L (e.g., IMERY). Preferably, the admixture includes about 1 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, or 10 wt. % of the conductor.

The process of preparing the material for use in an anode of a lithium ion battery can include thermalizing (at a temperature of about 600° C. to about 1200° C.; preferably to a temperature of about 750° C. to about 1100° C., or about 850° C. to about 1000° C.) an admixture of a plurality of silicon oxide nanoparticles, a carbon matrix precursor, and a catalyst or catalyst precursor, under a reducing atmosphere.

Here, the reducing atmosphere can include hydrogen ($H_2$) and/or an admixture of carbon monoxide (CO) and carbon dioxide ($CO_2$). Preferably, the process includes providing the admixture of the plurality of silicon oxide nanoparticles, carbon matrix precursor, and catalyst or catalyst precursor, and includes reducing the silicon oxide to silicon metal during the thermalizing step; The process can further includes forming an active catalyst from the catalyst precursor, preferably, during the thermalizing step.

The admixture can include a mass ratio of the silicon oxide nanoparticles to the carbon matrix precursor of about 10:1 to about 1:10, about 10:1 to about 1:5, about 5:1 to about 1:5, about 4:1 to about 1:4, about 3:1 to about 1:3, or about 2.5:1 to about 1:2.5, alternatively the admixture can include a mass ratio of the silicon oxide nanoparticles to the carbon matrix precursor of about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10. Alternatively, the admixture can include about 10 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, or 95 wt. % of the silicon oxide nanoparticles; can include about 10 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, or 95 wt. % of the carbon matrix precursor; and can include about 0.01 wt. %, 0.02 wt. %, 0.025 wt. %, 0.03 wt. %, 0.035 wt. %, 0.040 wt. %, 0.045 wt. %, 0.050 wt. %, 0.055 wt. %, 0.060 wt. %, 0.065 wt. %, 0.070 wt. %, 0.075 wt. %, 0.080 wt. %, 0.085 wt. %, 0.090 wt. %, 0.095 wt. %, 0.1 wt. %, 0.2 wt. %, 0.25 wt. %, 0.3 wt. %, 0.35 wt. %, 0.40 wt. %, 0.45 wt. %, 0.50 wt. %, 0.55 wt. %, 0.6 wt. %, 0.65 wt. %, 0.7 wt. %, 0.75 wt. %, 0.8 wt. %, 0.85 wt. %, 0.9 wt. %, 0.95 wt. %, 1 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, 10 wt. % of the catalyst or catalyst precursor.

In one instance the admixture of the plurality of silicon oxide nanoparticles, carbon matrix precursor, and catalyst or catalyst precursor is free of or substantially free of silicon metal. In still another instance, the admixture can include a graphitic material. In yet another instance, the admixture can consist essentially of the plurality of silicon oxide nanoparticles, carbon matrix precursor, and catalyst or catalyst precursor, optionally with the graphitic material. The admixture can include about 1 wt. %, 2 wt. %, 2.5 wt. %, 3 wt. %, 3.5 wt. %, 4 wt. %, 4.5 wt. %, 5 wt. %, 5.5 wt. %, 6 wt. %, 6.5 wt. %, 7 wt. %, 7.5 wt. %, 8 wt. %, 8.5 wt. %, 9 wt. %, 9.5 wt. %, 10 wt. %, 20 wt. %, 25 wt. %, 30 wt. %, 35 wt. %, 40 wt. %, 45 wt. %, or 50 wt. % of the graphitic material.

The silicon oxide nanoparticles preferably have mean diameter of less than about 1,000 nm, 500 nm, 400 nm, 350 nm, 300 nm, 250 nm, 200 nm, 150 nm, 100 nm, 75 nm, or 50 nm, and greater than about 1 nm, 5 nm, 10 nm, 15 nm, 20 nm, 25 nm, 30 nm, 35 nm, 40 nm, 45 nm, or 50 nm. Preferably, the silicon oxide nanoparticles have a $D_{90}$ of about 1,000 nm, 500 nm, 400 nm, 350 nm, 300 nm, 250 nm, 200 nm, 150 nm, 100 nm, 75 nm, or 50 nm; more preferably a D50 of about 1,000 nm, 500 nm, 400 nm, 350 nm, 300 nm, 250 nm, 200 nm, 150 nm, 100 nm, 75 nm, or 50 nm. In one instance, the silicon oxide nanoparticles are spherical. In another instance, the silicon oxide nanoparticles have a plate-like morphology. The silicon oxide nanoparticles can be the product of, for example, hydrolytic nanoparticle grown form siloxanes; in another example, the silicon oxide nanoparticles can be the annealed product from a sol-gel process; in still another example, the silicon oxide nanoparticles can be a triturated silicon oxide (glass/quartz), where the triturated silicon oxide can be the result of, for example, ball milling or other physical process(s) known to reduce the size of silicon oxides to nanoparticles.

The material for use in an anode of a lithium ion battery can also be prepared by thermalizing an admixture of a plurality of silicon nanocrystals, a carbon matrix precursor, and a plurality of silicon carbide fibers. In one instance, the admixture consists essentially of a plurality of silicon nanocrystals, a carbon matrix precursor, and a plurality of silicon carbide fibers; in another instance, the admixture consists of a plurality of silicon nanocrystals, a carbon matrix precursor, and a plurality of silicon carbide fibers. The admixture can include about 10 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, or 95 wt. % of the silicon nanoparticles. The admixture can include about 10 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, or 95 wt. % of the carbon matrix precursor. The admixture can include about 10 wt. %, 15 wt. %, 20 wt. %, 25 wt. %, 30 wt. %, 35 wt. %, 40 wt. %, 45 wt. %, or 50 wt. % of the silicon carbide fibers. Herein, the admixture preferably includes silicon carbide fibers having a length of less than 1,000 nm, 900 nm, 800 nm, 700 nm, 600 nm, 500 nm, 400 nm, 300 nm, 200 nm, or 100 nm.

In some instances, the anode active material may be a carbonaceous material, for example, crystalline carbon, amorphous carbon, and mixtures thereof. Examples of the crystalline carbon are graphite, such as natural graphite or artificial graphite that are in amorphous, plate, flake, spherical or fibrous form. Examples of the amorphous carbon are soft carbon (carbon sintered at low temperatures), hard carbon, meso-phase pitch carbides, sintered corks, and the like.

In other instances, the anode active material may be a noncarbonaceous material. For example, the anode active material may include at least one selected from the group consisting of a metal that is alloyable with lithium, an alloy of the metal alloyable with lithium, an oxide of the metal alloyable with lithium, and any combinations thereof. Examples of the metal alloyable with lithium are Si, Sn, Al, Ge, Pb, Bi, Sb, a Si—$Y^1$ alloy (where Y' is an alkali metal, an alkali earth metal, an element of Group 13 to Group 16 of the periodic table of elements, a transition metal, a rare earth element, or a combination thereof except for Si), and a Sn—$Y^1$ alloy (where $Y^1$ is an alkali metal, an alkali earth metal, a Group 13 to Group 16 element, a transition metal, a rare earth element, or a combination thereof except for Sn). $Y^1$ may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or any combinations thereof. Non-limiting examples of the transition metal oxide are a lithium titanium oxide, a vanadium oxide, and a lithium vanadium oxide. Non-limiting examples of the non-transition metal oxide are $SnO_2$ and $SiO_x$ (where $0<x<2$). For example, the anode active material may be at least one selected from the group consisting of Si, Sn, Pb, Ge, Al, SiOx (where $0<x\leq2$), $SnO_y$ (where $0<y\leq2$), $Li_4Ti_5O_{12}$, $TiO_2$, $LiTiO_3$, and $Li_2Ti_3O_7$, but is not limited thereto. In a preferably instance, the anode active material includes silicon or a silicon alloy.

In still another instance, the anode active material may be a composite of such a non-carbonaceous anode active material and a carbonaceous material. Alternatively, the anode active material may be a mixture of a carbonaceous anode active material and a non-carbonaceous material.

In a preferable instance, the anode active material is or includes a silicon-carbide reinforced reduced carbon matrix carrying a plurality of silicon nanocrystals, as described above. Preferably, the silicon-carbide reinforced reduced carbon matrix includes a carbon-constituent material, interior SiC nanofibers, and exterior SiC nanofibers; wherein the interior SiC nanofibers are carried within the carbon-constituent material and the exterior SiC nanofibers extend from a surface of the carbon-constituent material. In another preferable instance, the anode active material has a composition that includes about 20 wt. % to about 90 wt. % carbon as the carbon matrix, about 5 wt. % to about 75 wt. % silicon metal and the silicon nanocrystals, and about 1 wt. % to about 25 wt. % silicon-carbide as the SiC nanofibers.

Herein, the SiC nanofibers can have a length of about 10 nm to about 10,000 nm, about 10 nm to about 7500 nm, about 10 nm to about 5,000 nm, about 10 nm to about 4,000 nm, about 10 nm to about 3,000 nm, or about 10 nm to about 2,000 nm. More preferably, the SiC nanofibers are fibrous; that is, the length of the nanofibers are longer than the width and height. In one instance, the SiC nanofibers have a length to width ratio of at least 5, at least 10, at least 15, at least 20, at least 25, at least 30, at least 35, at least 40, at least 45, at least 50, at least 75, at least 100, at least 125, at least 150, at least 175, or at least 200.

In still another preferable instance, the SiC nanofibers are disposed in the anode active material. That is, the SiC nanofibers are carried within and through the anode active material. Preferably, the individual SiC nanofibers include internal SiC segments disposed in the anode active material and external SiC segments. In another instance, these external SiC segments can have lengths from about 1 nm to about 1,000 nm.

Still more preferably, the composition of the anode active material in the solid electrolytic matrix includes a mass ratio of the anode active material to the solid electrolyte of about 1:20, 1:19, 1:18, 1:17, 1:16, 1:15, 1:14, 1:13, 1:12, 1:11, 1:10, 1:9, 1:8, 1:7, 1:6, 1:5, 1:4, 1:3, 1:2, 1:1, 2:1, 3:1, 4:1, 5:1, 6:1, 8:1, 9:1, 10:1, 11:1, 12:1, 13:1, 14:1, 15:1, 16:1, 17:1, 18:1, 19:1, or 20:1, or ranges therebetween.

Another embodiment is an anode that includes the compositions described above. In one instance, the anode includes the composition of the anode active material in the solid electrolytic matrix carried on a current collector. In one instance, the current collector is a metal sheet or foil (e.g., copper or nickel).

In one instance, the ratio of the anode active material to the solid electrolyte is constant across a thickness of the anode (from an anodic side (adjacent to the current collector) to a cathodic side (distal to the current collector)). In another instance, the ratio of the anode active material decreases as distance from the anodic side to the cathodic side, conversely the concentration of the solid electrolyte increases from the anodic side to the cathodic side. Notably, the change in concentration can be linear (including parabolic) or can be step wise (e.g., including 2, 3, 4, 5, 6, 7, 8, 9, or 10 step increases in the relative concentration of the solid electrolyte from the anodic side to the cathodic side).

Preferably, the anode has a specific capacity of about 1,000 to about 3,500 mAh/g, about 1,200 to about 3,500 mAh/g, about 1,400 to about 3,500 mAh/g, about 1,000 to about 3,000 mAh/g, about 1,000 to about 2,500 mAh/g, about 1,200 to about 2,500 mAh/g, or about 1,500 to about 2,500 mAh/g.

Optionally, the anode composition further includes a conducting agent. Non-limiting examples of the conducting agent are acetylene black, ketjen black, natural graphite, artificial graphite, carbon black, carbon fiber, and metal powder and metal fiber of, for example, copper, nickel, aluminum or silver. In some embodiments at least one conducting material such as polyphenylene derivatives may be used in combination. Any conducting agent available in the art may be used. The above-described crystalline carbonaceous materials may be further added as the conducting agent.

Still yet another embodiment is a lithium battery that includes a cathode, an anode, and a separator sealed in a battery case with a solid electrolyte in ionic contact with both the cathode and the anode. Preferably, the anode includes an anode composition affixed to a current collector; where the anode composition includes the compositions described above, anode active material carried in a SiC-reinforced solid electrolytic matrix. The anode active material, preferably including the silicon-carbide reinforced reduced carbon matrix with interior SiC nanofibers, and exterior SiC nanofibers; where the exterior SiC nanofibers extend into and reinforce the solid electrolyte.

Generally, a lithium battery includes a cathode, an anode, and a separator. The cathode, the anode, and the separator (here, additional solid electrolyte) can be wound or folded, and then sealed in a battery case. The battery case may be a cylindrical type, a rectangular type, or a thin-film type. For example, the lithium battery may be a thin-film type battery. The lithium battery may be a lithium ion battery.

The lithium battery may have increased charge/discharge rate, electric capacity, and lifetime characteristics, and thus may be applicable in an electric vehicle (EV), for example, in a hybrid vehicle such as plug-in hybrid electric vehicle (PHEV).

Still another embodiment is a method of preparing the compositions provided above. The method can include admixing an anode active particulate that includes a reduced carbon matrix carrying a plurality of silicon nanocrystals and a plurality of SiC nanofibers, with a solid electrolyte. Preferably, individual SiC nanofibers have internal SiC segments disposed in the reduced carbon matrix and external SiC segments extending from a surface of the anode active particulate. More preferably, the external SiC segments extending from a surface of the anode active particulate intersperse with the solid electrolyte. In one instance, fine powders (e.g., with diameters of less than 10 micron) of the anode active particulate and the solid electrolyte are admixed and then pressed, e.g., by a hydraulic press, calendar roller, or other machine. In another instance, the anode active particulate and the solid electrolyte are admixed with a solvent, then this admixture cast onto a surface (e.g., a current collector). In one example, the solvent is removed from the admixture, in another instance, the solvent remains in the admixture. In still another instance, the anode active particulate is admixed with a solid electrolyte that includes a polymer, preferably, wherein the anode active particulate and the polymer are admixed at a temperature greater than a melting point of the polymer.

Examples

Products were prepared using standard GLP procedures for handling of the respective materials and admixtures. All commercial materials were used as received.

Example 1 (High Fiber): an admixture of about 52 wt. % silicon nanocrystals, about 7 wt. % conductive carbon, about 7 wt. % nickel nitrate hexahydrate, and about 33 wt. % phenolic resin in ethanol was spray dried to give micron sized particulates that include an admixture of a plurality of silicon nanocrystals, a carbon matrix precursor, and a catalyst or catalyst precursor. The particulates were then thermalized under an argon/hydrogen atmosphere at 1000° C. An SEM image of the product is shown in FIG. 1.

Figure 2:
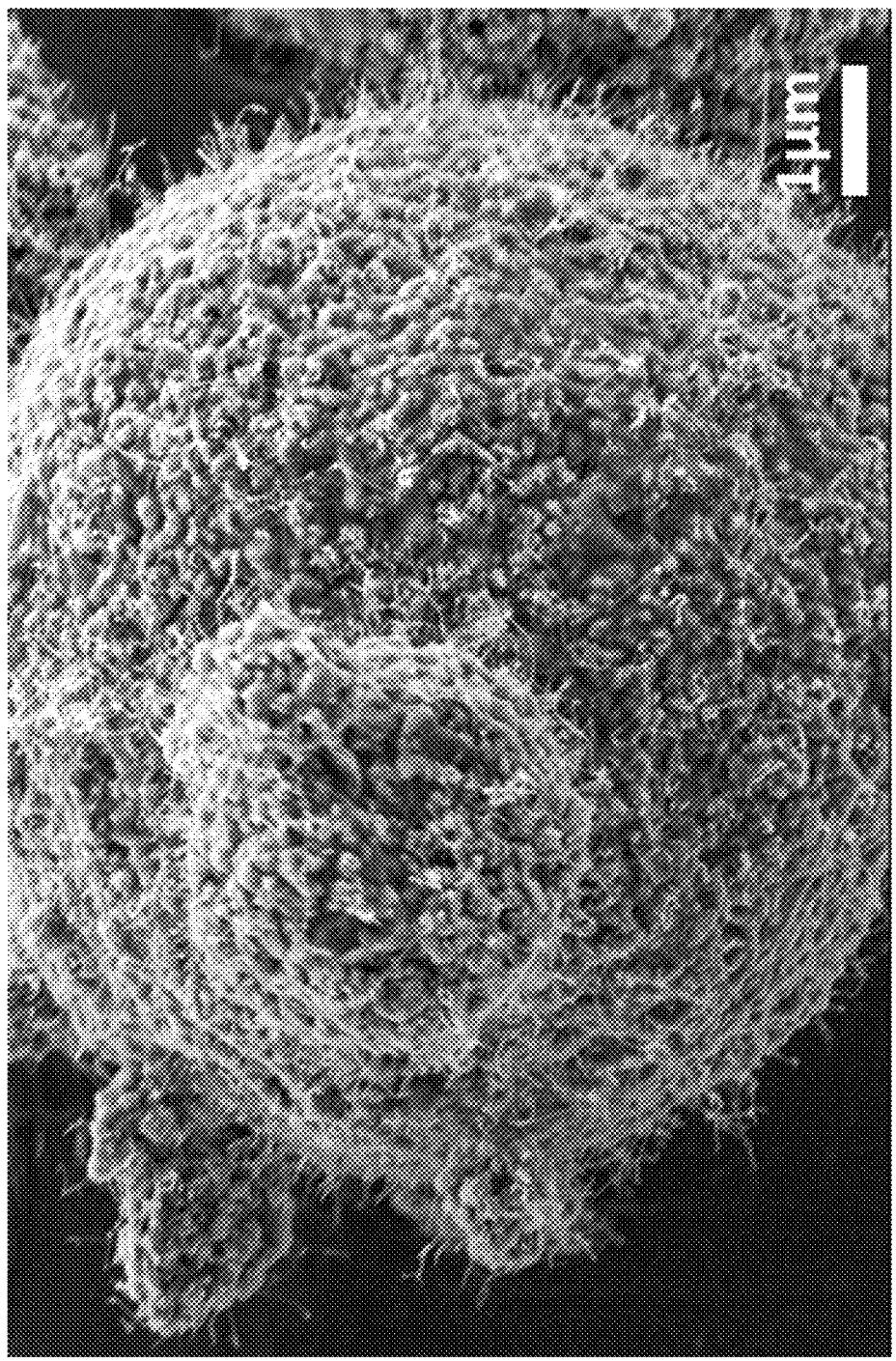
FIG. 2 is an SEM image of a second anode active material described herein showing SiC nanofibers carried on and extending from a surface.

Example 2 (Mid Fiber): an admixture of about 46 wt. % silicon nanocrystals, about 2 wt. % conductive carbon, about 8.2 wt. % nickel acetate tetrahydrate, about 12 wt. % copper acetate monohydrate, about 16 wt. % phenolic resin, and about 15 wt. % pitch in an admixture of NMP and ethanol was spray dried to give micron sized particulates that include an admixture of a plurality of silicon nanocrystals, a carbon matrix precursor, and a catalyst or catalyst precursor. The particulates were then thermalized argon/hydrogen atmosphere at 1000° C. An SEM image of the product is shown in FIG. 2.

Example 3 (Mid Fiber-C): was identical to Example 2 but the particulates heated under an argon/hydrogen atmosphere to 1000° C. and were then held at temperature under a flow of argon/methane/carbon dioxide for 3 h.

Example 4 (Low Fiber): an admixture of about 50 wt. % silicon nanocrystals, about 2 wt. % conductive carbon, about 8 wt. % nickel acetate tetrahydrate, about 12 wt. % copper acetate monohydrate, about 16 wt. % phenolic resin, and about 12 wt. % pitch in an admixture of NMP and ethanol was spray dried to give micron sized particulates that include an admixture of a plurality of silicon nanocrystals, a carbon matrix precursor, and a catalyst or catalyst precursor. The particulates were then thermalized an argon/hydrogen atmosphere at 850° C.

Example 5: an admixture of about 56 wt. % silicon nanocrystals, about 2 wt. % conductive carbon, about 5 wt. % nickel acetate tetrahydrate, about 8 wt. % copper acetate monohydrate, about 17 wt. % phenolic resin, and about 12 wt. % pitch in an admixture of NMP and ethanol was spray dried to give micron sized particulates that include an admixture of a plurality of silicon nanocrystals, a carbon matrix precursor, and a catalyst or catalyst precursor. The particulates were then thermalized an argon/hydrogen atmosphere at 850° C.

Example 6: an admixture of about 65 wt. % silicon nanocrystals, about 2 wt. % conductive carbon, about 0.4 wt. % nickel acetate tetrahydrate, about 0.6 wt. % copper acetate monohydrate, about 18 wt. % phenolic resin, and about 14 wt. % pitch in an admixture of NMP and ethanol was spray dried to give micron sized particulates that include an admixture of a plurality of silicon nanocrystals, a carbon matrix precursor, and a catalyst or catalyst precursor. The particulates were then thermalized an argon/hydrogen atmosphere at 850° C.

Comparative Example (No Fiber): an admixture of about 65 wt. % silicon nanocrystals, about 2.5 wt. % conductive carbon, about 19 wt. % phenolic resin, and about 14 wt. % pitch in an admixture of NMP and ethanol was spray dried to give micron sized particulates that include an admixture of a plurality of silicon nanocrystals, a carbon matrix precursor. The particulates were then thermalized under an argon/hydrogen atmosphere at 1000° C. The SEM of the product showed no SiC nanofibers.

While the compositions and methods of this invention have been described in terms of preferred embodiments, it will be apparent to those of skill in the art that variations may be applied to the compositions and/or methods in the steps or in the sequence of steps of the method described herein without departing from the concept, spirit and scope of the invention. More specifically, it will be apparent that certain agents that are both chemically and physically related may be substituted for the agents described herein while the same or similar results would be achieved. All such similar substitutes and modifications apparent to those skilled in the art are deemed to be within the spirit, scope and concept of the invention as defined by the appended claims.

What is claimed:

1. A method comprising:
   admixing an anode active particulate that includes a reduced carbon matrix carrying a plurality of silicon nanocrystals with a solid electrolyte;
   wherein the anode active particulate further includes a plurality of SiC nanofibers.

2. The method of claim 1, wherein the reduced carbon matrix carries the SiC nanofibers.

3. The method of claim 1, wherein individual SiC nanofibers have internal SiC segments disposed in the reduced carbon matrix and external SiC segments extending from a surface of the anode active particulate; wherein the external SiC segments intersperse with the solid electrolyte.

4. The method of claim 1, wherein the solid electrolyte includes a lithium thiophosphate, lithium phosphate; lithium lanthanum zirconium oxide; NASICON-type phosphate; LISICON-type germanium oxide; lithium lanthanum titanium oxide; or lithium phosphorous oxynitride.

5. The method of claim 1, wherein the solid electrolyte includes a polymer.

6. The method of claim 5, wherein the anode active particulate and the polymer are admixed at a temperature greater than a melting point of the polymer.

* * * * *